(12) United States Patent
Nguyen

(10) Patent No.: US 10,613,644 B2
(45) Date of Patent: Apr. 7, 2020

(54) DEVICE FOR SHARING CONTENT AND METHOD THEREOF

(71) Applicant: SAMSUNG ELECTRONICS CO., LTD., Suwon-si, Gyeonggi-do (KR)

(72) Inventor: Van Canh Nguyen, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 373 days.

(21) Appl. No.: 15/594,890

(22) Filed: May 15, 2017

(65) Prior Publication Data
US 2017/0329423 A1  Nov. 16, 2017

(30) Foreign Application Priority Data

May 16, 2016 (KR) .................. 10-2016-0059393

(51) Int. Cl.
*H04L 29/06* (2006.01)
*G06F 3/0354* (2013.01)
(Continued)

(52) U.S. Cl.
CPC ........ *G06F 3/03545* (2013.01); *G06F 3/0383* (2013.01); *G06F 3/0488* (2013.01); *G06F 21/604* (2013.01); *H04L 67/28* (2013.01); *H04L 67/38* (2013.01); *H04W 76/14* (2018.02); *G06F 2203/0384* (2013.01)

(58) Field of Classification Search
None
See application file for complete search history.

(56) References Cited

U.S. PATENT DOCUMENTS 6,973,477 B1 * 12/2005 Martino ................ G06Q 20/00
                                                   348/E7.081
7,128,270 B2 * 10/2006 Silverbrook ........ G06F 3/03545
                                                     235/472.01
(Continued)

FOREIGN PATENT DOCUMENTS

JP   H07-028585      1/1995
KR   10-2009-0124135  12/2009

OTHER PUBLICATIONS

Satyamoorthy, Anand et al. Wireless Power Receiver for Mobile Devices Supporting Inductive and Resonant Operating Modes. 2014 IEEE Wireless Power Transfer Conference. https://ieeexplore.ieee.org/stamp/stamp.jsp?tp=&arnumber=6839626 (Year: 2014).*

(Continued)

*Primary Examiner* — Jeremiah L Avery
(74) *Attorney, Agent, or Firm* — Nixon & Vanderhye, P.C.

(57) ABSTRACT

An input device for an electronic device includes a first communication module comprising communication circuitry configured to communicate with a first electronic device, a second communication module comprising communication circuitry configured to communicate with a second electronic device, a battery, and a processor. The processor is configured to receive content from the first electronic device through the first communication module, to transmit the content to the second communication module without storing the content in a memory and to transmit the content to the second electronic device through the second communication module using power supplied from the battery.

19 Claims, 9 Drawing Sheets

(51) Int. Cl.
*G06F 3/038* (2013.01)
*G06F 21/60* (2013.01)
*H04W 76/14* (2018.01)
*G06F 3/0488* (2013.01)
*H04L 29/08* (2006.01)

(56) References Cited

U.S. PATENT DOCUMENTS

| | | | | |
|---|---|---|---|---|
| 8,826,459 | B2* | 9/2014 | Swist | H04N 21/41415 |
| | | | | 711/163 |
| 9,071,603 | B1* | 6/2015 | Frederick | H04L 67/125 |
| 9,086,746 | B1* | 7/2015 | Olsen | G06F 3/03545 |
| 9,703,946 | B2* | 7/2017 | Chandran | G06F 3/0416 |
| 9,832,718 | B2* | 11/2017 | Yamazaki | H04W 48/20 |
| 2005/0027794 | A1* | 2/2005 | Decker | G08C 17/00 |
| | | | | 709/201 |
| 2006/0223530 | A1* | 10/2006 | Bumiller | H04L 29/12122 |
| | | | | 455/435.1 |
| 2011/0113121 | A1* | 5/2011 | Sarkar | H04L 67/38 |
| | | | | 709/218 |
| 2013/0203353 | A1 | 8/2013 | Kim et al. | |
| 2013/0271406 | A1 | 10/2013 | Kim et al. | |
| 2017/0064055 | A1 | 3/2017 | Kim et al. | |

OTHER PUBLICATIONS

Benharref, Abdelghani et al. Smart Data Synchronization in m-Health Monitoring Applications. 2014 IEEE 16th International Conference on e-Health Networking, Applications and Services (Healthcom). https://ieeexplore.ieee.org/stamp/stamp.jsp?tp=&arnumber=7001831 (Year: 2014).*

* cited by examiner

DEVICE FOR SHARING CONTENT AND METHOD THEREOF

CROSS-REFERENCE TO RELATED APPLICATION

This application is based on and claims priority under 35 U.S.C. § 119 to a Korean patent application filed on May 16, 2016 in the Korean Intellectual Property Office and assigned Serial number 10-2016-0059393, the disclosure of which is incorporated by reference herein in its entirety.

TECHNICAL FIELD

The present disclosure relates generally to a method for sharing content between a plurality of electronic devices.

BACKGROUND

With the developments of wireless technologies, an electronic device is easy to carry and is able to freely connect to wired/wireless networks. For example, the electronic device, such as a smartphone or a tablet PC, supports various functions as well as call and message functions based on an application program installed in the electronic device.

The electronic device includes a touch screen, which receives a user input through the finger of a user, as an input device. Nowadays, the electronic device provides the ability to write or draw through a separate input device such as a stylus pen.

A conventional input device such as a stylus pen communicates with an electronic device to simply transmit input coordinates. However, the conventional input device is not used to transmit content (e.g., a text, an image, or the like) or to share the content with another electronic device.

SUMMARY

Example aspects of the present disclosure address at least the above-mentioned problems and/or disadvantages and to provide at least the advantages described below. Accordingly, an example aspect of the present disclosure provides a method for sharing content with another electronic device through an input device.

In accordance with an example aspect of the present disclosure, an input device for an electronic device includes a first communication module comprising communication circuitry configured to communicate with a first electronic device, a second communication module comprising communication circuitry configured to communicate with a second electronic device, a battery, and a processor. The processor is configured to receive content from the first electronic device through the first communication module, to transmit the content to the second communication module without storing the content in a memory and to transmit the content to the second electronic device through the second communication module using power supplied from the battery.

In accordance with another example aspect of the present disclosure, a content sharing method of an input device for an electronic device includes receiving content from a first electronic device through a first communication module of the input device, transmitting the content to a second communication module of the input device without storing the content in a memory, and transmitting the content to a second electronic device through the second communication module of the input device using power supplied from a battery included in the input device.

In accordance with another example aspect of the present disclosure, a computer-readable recording medium has recorded thereon a program which, when executed by a processor, causes an input device to perform a method. The method includes receiving content from a first electronic device through a first communication module of the input device, transmitting the content to a second communication module of the input device without storing the content in a memory, and transmitting the content to a second electronic device through the second communication module of the input device using power supplied from a battery included in the input device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
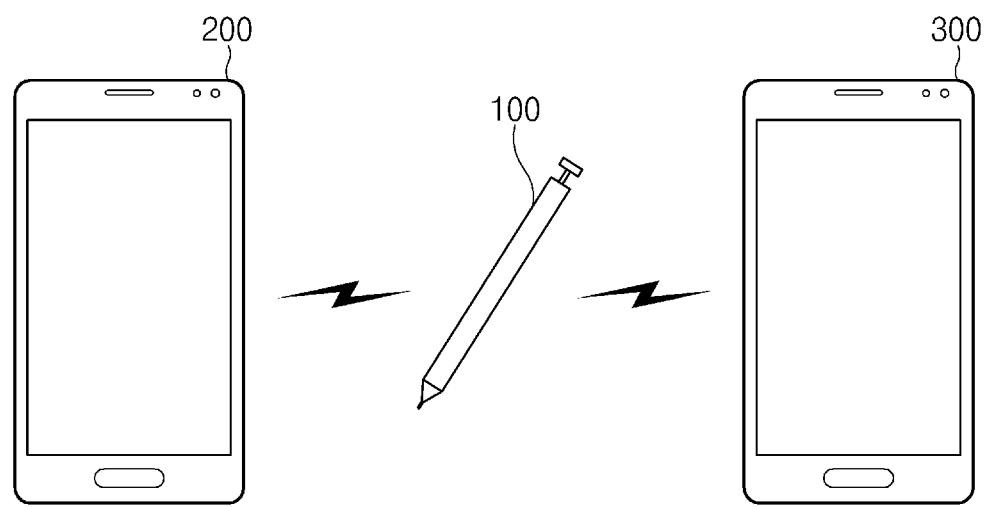
FIG. 1 is a diagram illustrating an example content sharing system, according to various example embodiments of the present disclosure.

Hereinafter, various example embodiments of the present disclosure may be described with reference to accompanying drawings. Accordingly, those of ordinary skill in the art will recognize that modification, equivalent, and/or alternative on the various example embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used interchangeably with, for example, the expression "suitable for", "having the capacity to", "designed to", "adapted to", "made to", or "capable of". The term "configured to" does not refer only to "specifically designed to" in hardware. Instead, the expression "a device configured to" may refer to a situation in which the device is "capable of" operating together with another device or other components. For example, a "processor configured to (or set to) perform A, B, and C" may refer, for example, and without limitation, to a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe various specific example embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit), or the like, but is not limited thereto.

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, and Google TV™), game consoles (e.g., Xbox™ and PlayStation™), electronic dictionaries, electronic keys, camcorders, electronic picture frames, and the like, but is not limited thereto.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like), or the like, but is not limited thereto.

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like), or the like, but is not limited thereto. According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 is a diagram illustrating an example content sharing system, according to various example embodiments of the present disclosure.

Referring to FIG. 1, the content sharing system may include an input device 100, a first electronic device 200, and a second electronic device 300.

According to an embodiment, the input device 100 may include various circuitry, such as, for example, and without limitation, an electric pen (or a stylus pen). The input device 100 may be, for example, a device that inputs a user manipulation by contacting with a display screen of the first electronic device 200 or the second electronic device 300.

According to an embodiment, each of the first electronic device 200 and the second electronic device 300 may be a user device. Each of the first electronic device 200 and the second electronic device 300 may include various user devices, such as, for example, and without limitation, a smart electronic device, which is capable of installing and executing an application, for example, a smartphone, a smart watch, a smart TV, or the like. Each of the first electronic device 200 and the second electronic device 300 may be an electronic device of the same user or may be an electronic device of another user. According to an embodiment, the first electronic device 200 and the second electronic device 300 may include a pen sensor that is capable of sensing a user manipulation by the input device 100.

According to an embodiment, the input device 100 may communicate with the first electronic device 200 in, for example, a short-range wireless communication scheme. For example, the input device 100 and the first electronic device 200 may perform Bluetooth communication. According to an embodiment, the input device 100 may transmit content to the first electronic device 200 or may receive content from the first electronic device 200, in the short-range wireless communication scheme.

According to an embodiment, the input device 100 may communicate with the second electronic device 300 in an electromagnetic communication scheme. According to an embodiment, while the input device 100 is in contact with a specific part (e.g., a touch screen) of the second electronic device 300 (or while the input device 100 is located within a specified distance between a touch screen and the input device 100 without contacting with the specific part), the input device 100 may communicate with the second electronic device 300. If the input device 100 is spaced apart from the specified part of the second electronic device 300 by a specified distance or more, it may not be within range to communicate with the second electronic device 300.

According to an embodiment, the first electronic device 200 and the second electronic device 300 may share content with each other through the input device 100. For example, the input device 100 may receive content from the first electronic device 200 and may transmit the received content to the second electronic device 300. Alternatively, the input device 100 may receive content from the second electronic device 300 and may transmit the received content to the first electronic device 200. According to an embodiment, the input device 100 may transmit the content, which is received from the first electronic device 200 or the second electronic device 300, to the second electronic device 300 or the first electronic device 200 in an on the fly scheme without storing the content in a memory. The input device 100 may not include, for example, a memory that stores the content to be shared. As such, the input device 100 may not perform an operation of storing the content received from the first electronic device 200 or the second electronic device 300.

According to an embodiment, the input device 100 may be an input device that is registered in the first electronic device 200 (or operates in conjunction with the first electronic device 200). According to various embodiments of the present disclosure, even though the input device 100 is not registered in the second electronic device 300 or even though the input device 100 is not connected with the second electronic device 300, the first electronic device 200 and the second electronic device 300 may share content through the input device 100.

If the content is received, the first electronic device 200 or the second electronic device 300 may perform an operation corresponding to the received content. For example, if a type of the content is an image or a video, the first electronic device 200 or the second electronic device 300 may display an image or a video in a display. As another example, if the content is a uniform resource locator (URL), the first electronic device 200 or the second electronic device 300 may launch a web browser and may connect with a web page corresponding to the received URL. As another example, if the content is contact information, the first electronic device 200 or the second electronic device 300 may store the received contact information.

Figure 2:
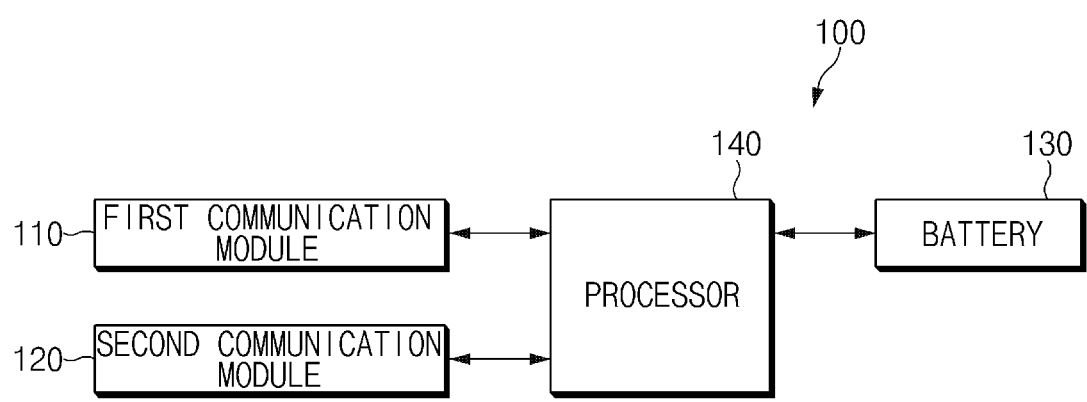
FIG. 2 is a block diagram illustrating an example configuration of an input device, according to various example embodiments of the present disclosure.

FIG. 2 is a block diagram illustrating an example configuration of an input device, according to various example embodiments of the present disclosure.

Referring to FIG. 2, the input device 100 may include a first communication module (e.g., including communication circuitry) 110, a second communication module (e.g., including communication circuitry) 120, a battery 130, and a processor (e.g., including processing circuitry) 140.

The first communication module 110 may include various communication circuitry and may communicate with the first electronic device 200. According to an embodiment, the first communication module 110 may include various communication circuitry, such as, for example, and without limitation, a short-range wireless communication module. The first communication module 110 may include, for example, a Bluetooth module, a near field communication (NFC) module, or a wireless-fidelity (Wi-Fi) module.

The second communication module 120 may include various communication circuitry and may communicate with the second electronic device 300. According to an embodiment, the second communication module 120 may include various communication circuitry, such as, for example, and without limitation, an electromagnetic communication module. According to an embodiment, while the second communication module 120 is in contact with or within a predetermined distance of a specific part (e.g., a touch screen) of the second electronic device 300, the second communication module 120 may communicate with the second electronic device 300.

According to an embodiment, the second communication module 120 may include various communication circuitry, such as, for example, and without limitation, an electromagnetic coil and a transceiver circuit. The electromagnetic coil may operate as an antenna that transmits or receives an electromagnetic signal. The transceiver circuit may transmit the electromagnetic signal to the second electronic device 300 through the electromagnetic coil or may receive the electromagnetic signal from the second electronic device 300.

The battery 130 may power each element included in the input device 100 under control of the processor 140. For example, the battery 130 may power the first communication module 110, the second communication module 120, and the processor 140. According to an embodiment, the battery 130 may include a rechargeable battery (e.g., a Li-ion battery) and/or a solar battery.

According to an embodiment, the input device 100 may further include a power management module that manages the power of a battery. The power management module may include a power management integrated circuit (PMIC), a charger integrated circuit (IC), or a battery or fuel gauge.

The processor 140 may include various processing circuitry and control overall operations of the input device 100. For example, the processor 140 may share content according to various embodiments of the present disclosure by controlling each of the first communication module 110, the second communication module 120, and the battery 130 (or a power management module).

According to an embodiment, the processor 140 may receive content sharing information from the first electronic device 200 through the first communication module 110. The content sharing information may include, for example, information indicating that there is the content to be shared. The content sharing information may further include, for example, information about the content to be shared such as a type of the content (e.g., a text, an image, a video, or the like), a size of the content, a device in which the content is stored, a storage address of the content, a content sharing method, or the like. The information about the content sharing method may include, for example, information about whether to share the content through the input device 100 or whether to share the content without passing through the input device 100. According to an embodiment, the processor 140 may transmit the content sharing information to the second electronic device 300 through the second communication module 120.

According to an embodiment, if a content sharing request is received from the second electronic device 300 through the second communication module 120, the processor 140 may make a request to the first electronic device 200 for the content through the first communication module 110. According to an embodiment, the processor 140 may receive the content from the first electronic device 200 through the first communication module 110. According to an embodiment, the processor 140 may transmit the content, which is received from the first electronic device 200, to the second communication module 120 without storing the content in a memory. According to an embodiment, the processor 140 may transmit the content, which is received from the first electronic device 200, to the second electronic device 300 through the second communication module 120. That is, the processor 140 may transmit the content, which is received from the first electronic device 200, to the second electronic device 300 in an on the fly scheme without storing the content in the memory. According to an embodiment, the processor 140 may transmit the content to the second electronic device 300 through the second communication module 120 by using power supplied from the battery 130.

According to an embodiment, the processor 140 may generate an electromagnetic signal corresponding to the content, which is received from the first electronic device 200, by using a transceiver circuit included in the second communication module 120. The processor 140 may modulate the frequency or the phase of the electromagnetic signal by using the transceiver circuit and may transmit the modulated electromagnetic signal to the second electronic device 300 through the electromagnetic coil.

According to an embodiment, the processor 140 may receive the content sharing information from the second electronic device 300 through the second communication module 120. According to an embodiment, the processor 140 may transmit the content sharing information to the first electronic device 200 through the first communication module 110.

According to an embodiment, if a content sharing request is received from the first electronic device 200 through the first communication module 110, the processor 140 may make a request to the second electronic device 300 for the content through the second communication module 120. According to an embodiment, the processor 140 may receive the content from the second electronic device 300 through the second communication module 120. According to an embodiment, the processor 140 may transmit the content, which is received from the second electronic device 300, to the first communication module 110 without storing the content in a memory. According to an embodiment, the processor 140 may transmit the content, which is received from the second electronic device 300, to the first electronic device 200 through the first communication module 110. That is, the processor 140 may transmit the content, which is received from the second electronic device 300, to the first electronic device 200 in an on the fly scheme without storing the content in the memory.

Figure 3:
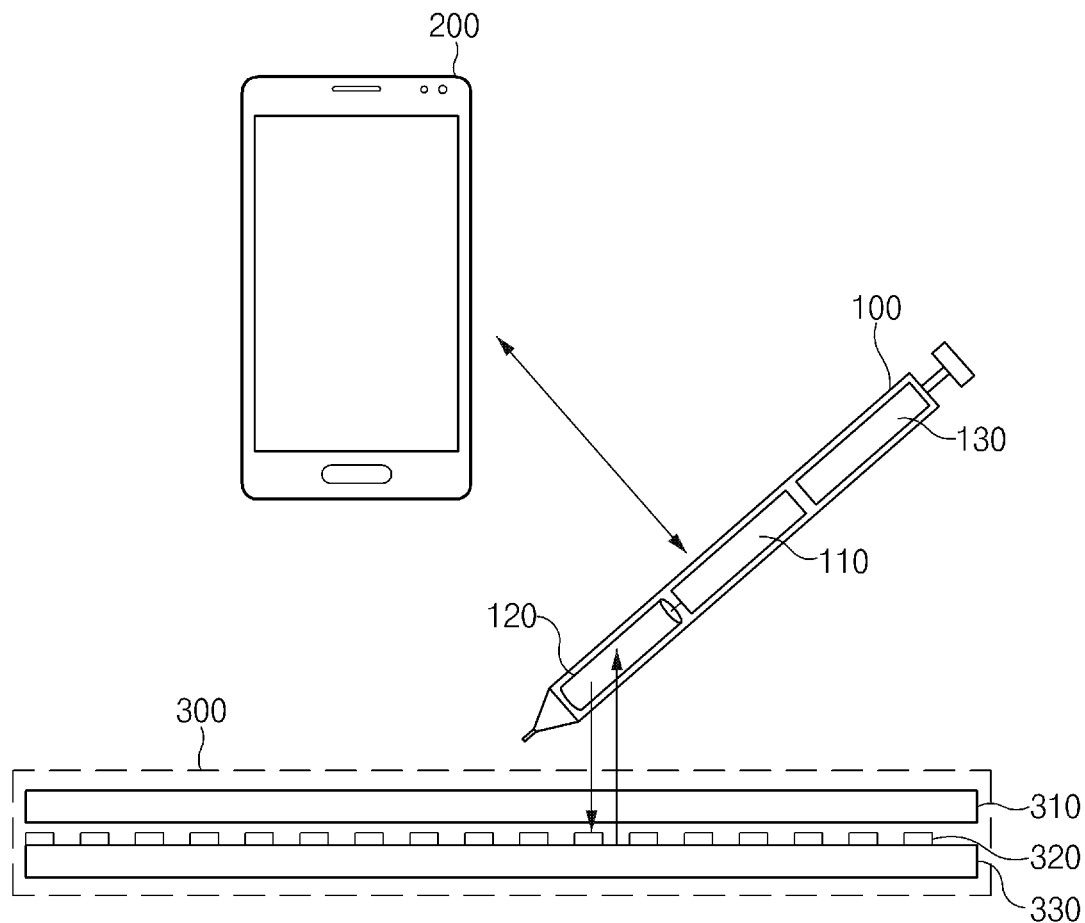
FIG. 3 is a diagram illustrating an example electromagnetic communication method, according to various example embodiments of the present disclosure.

FIG. 3 is a diagram illustrating an electromagnetic communication method, according to various example embodiments of the present disclosure.

Referring to FIG. 3, the input device 100 may include the first communication module 110, the second communication module 120, and the battery 130. The second electronic device 300 may include a touch screen 310, an electromagnetic receiver 320, and an electromagnetic transmitter 330.

According to an embodiment, the input device 100 may transmit or receive data (e.g., content sharing information or content) to or from the first electronic device 200 through the first communication module 110.

According to an embodiment, while the input device 100 is in contact with the touch screen 310 of the second electronic device 300 (or while the input device 100 is located within a specified distance between the touch screen 310 and the input device 100 without contacting with the touch screen 310), the input device 100 may perform electromagnetic communication with the second electronic device 300. According to an embodiment, the electromagnetic receiver 320 of the second electronic device 300 may receive a user input by the input device 100 or may be used when receiving data (e.g., content) from the input device 100. According to an embodiment, the electromagnetic transmitter 330 of the second electronic device 300 may be used to transmit data (e.g., content) to the input device 100.

According to an embodiment, the second electronic device 300 may transmit the electromagnetic signal, of which the frequency or the phase is modulated, to the input device 100 through the electromagnetic transmitter 330. The input device 100 may receive an electromagnetic signal through an electromagnetic coil of the second communication module 120 and may demodulate the received electromagnetic signal.

The second communication module 120 may generate an electromagnetic signal corresponding to data (e.g., content sharing information or content) to be transmitted and may modulate the frequency or the phase of an electromagnetic signal. The second communication module 120 may transmit the electromagnetic signal, of which the frequency or the phase is modulated, to the second electronic device 300 through an electromagnetic coil. The electromagnetic receiver 320 of the second electronic device 300 may receive an electromagnetic signal from the second communication module 120 and may demodulate the received electromagnetic signal.

According to an embodiment, if the input device 100 approaches the second electronic device 300, the input device 100 may generate vibration in an electromagnetic coil included in the second communication module 120 of the input device 100 by the electromagnetic signal generated from the electromagnetic receiver 320 of the second electronic device 300, and thus a current may be generated. The input device 100 may transmit the electromagnetic signal to the second electronic device 300 by using the current generated by the vibration of the electromagnetic coil.

According to an embodiment, the input device 100 may include the battery 130. As such, even though an induced current is not generated by the electromagnetic signal received from the second electronic device 300, the input device 100 may transmit the electromagnetic signal to the second electronic device 300 by using the power supplied from the battery 130.

According to an embodiment, the electromagnetic receiver 320 and the electromagnetic transmitter 330 included in the second electronic device 300 may not be activated at the same time and may be activated at different times from each other. For example, in a state where the electromagnetic receiver 320 is activated, the electromagnetic transmitter 330 may be deactivated. In a state where the electromagnetic transmitter 330 is activated, the electromagnetic receiver 320 may be deactivated.

Figure 4:
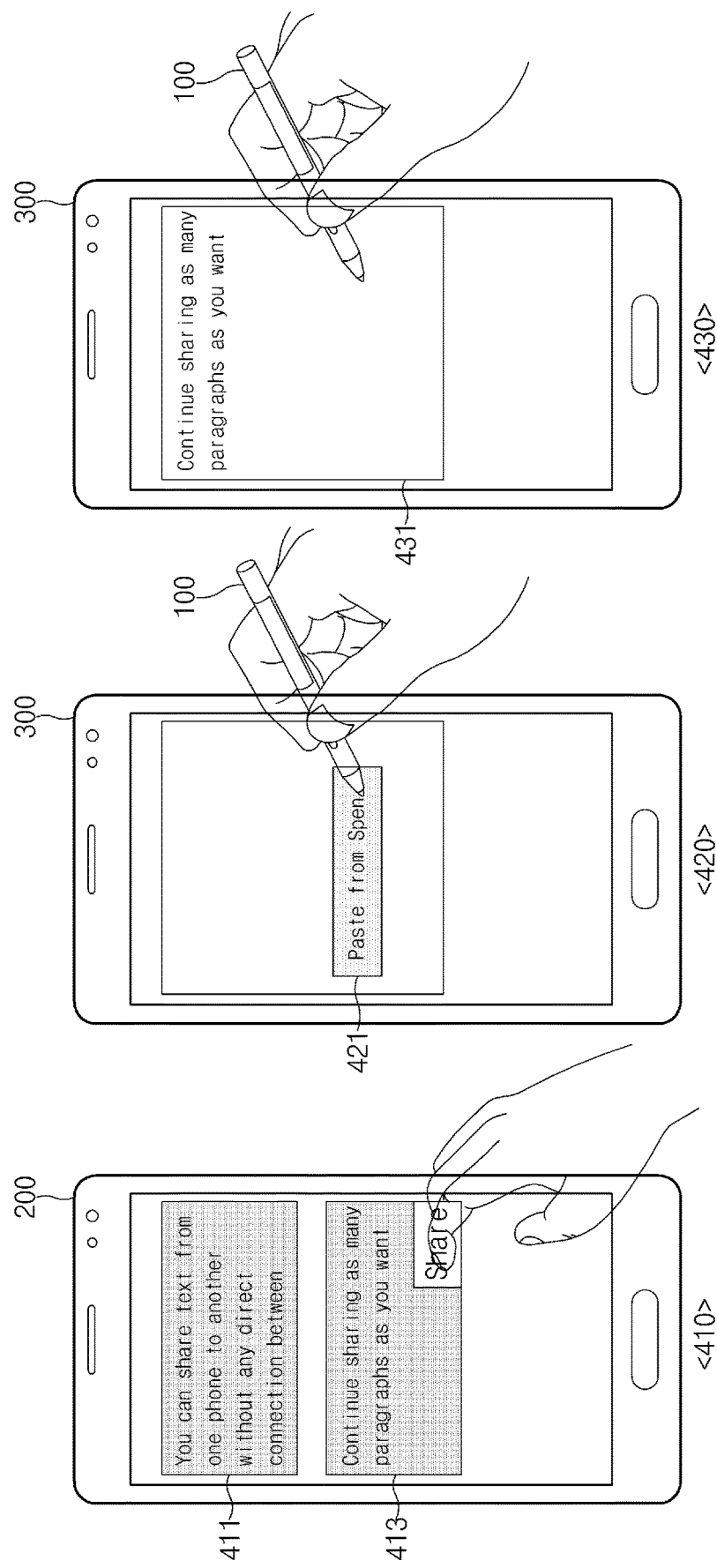
FIG. 4 is a diagram illustrating an example user interface, according to various example embodiments of the present disclosure.

FIG. 4 is a diagram illustrating an example user interface, according to various example embodiments of the present disclosure.

According to an embodiment, the first electronic device 200 may display content in a display (or a touch screen). For example, referring to an image 410 of FIG. 4, the first electronic device 200 may display a first content 411 and a second content 413. According to an embodiment, the first electronic device 200 may receive a user input for setting one of the pieces of content as sharing content. For example, the first electronic device 200 may receive a user input for setting the second content 413 as the sharing content. A user may input, for example, a user command for setting the sharing content by using a finger. If the sharing content is set, the first electronic device 200 may transmit content sharing information to the input device 100 through Bluetooth communication.

According to an embodiment, the second electronic device 300 may receive a user input for requesting the sharing of the content. For example, referring to image 420 of FIG. 4, the second electronic device 300 may receive the user input through the input device 100. If a user touches the input device 100 to the touch screen of the second electronic device 300 for a user input, the input device 100 may transmit content sharing information, which is received from the first electronic device 200, to the second electronic device 300. If the content sharing information is received from the input device 100, the second electronic device 300 may display an object 421 indicating the request to share the content, in a display (or a touch screen). The second electronic device 300 may receive a user input for requesting the content sharing, through the object 421 displayed in the display.

If the user input is received, the second electronic device 300 may make a request to the first electronic device 200 for content and may receive the content from the first electronic device 200. Referring to an image 430 of FIG. 4, the second electronic device 300 may display content 431, which is received from the first electronic device 200, in the display.

According to an embodiment, if a type of the content is a text or the size of the content is less than a specified size, the second electronic device 300 may make a request to the first electronic device 200 for the content through the input device 100 and may receive the content from the first electronic device 200 through the input device 100. According to another embodiment, if the type of the content is an image or a video or the size of the content is not less than the specified size, the second electronic device 300 may directly request the content from the first electronic device 200 without passing through the input device 100 and may directly receive the content from the first electronic device 200.

Figure 5:
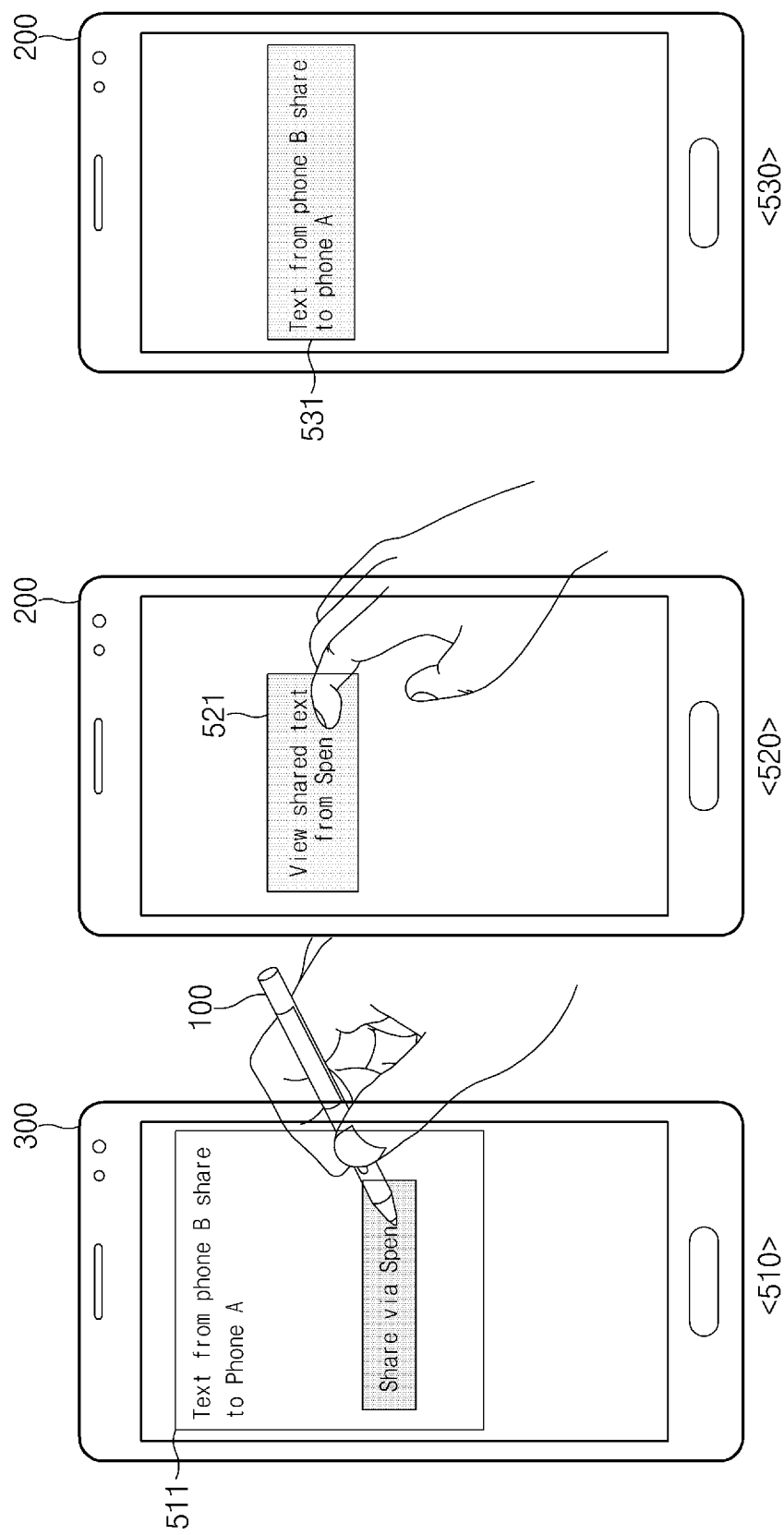
FIG. 5 is a diagram illustrating an example user interface, according to various example embodiments of the present disclosure.

FIG. 5 is a diagram illustrating an example user interface, according to various example embodiments of the present disclosure.

Referring to an image 510 of FIG. 5, the second electronic device 300 may display content 511 in a display. According to an embodiment, the second electronic device 300 may receive a user input for setting sharing content. For example, the second electronic device 300 may receive the user input for setting content 511, which is displayed in the display, as the sharing content. A user may input, for example, a user command for setting the sharing content by using the input device 100.

If the sharing content is set, the second electronic device 300 may transmit content sharing information to the input device 100 through electromagnetic communication. The input device 100 may transmit the content sharing information, which is received from the second electronic device 300, to the first electronic device 200 through Bluetooth communication According to an embodiment, the second electronic device 300 may receive a user input for requesting the sharing of the content. For example, referring to an image 520 of FIG. 5, if the content sharing information is received from the input device 100, the first electronic device 200 may display an object 521 indicating the request to share the content, in the display (or a touch screen). The first electronic device 200 may receive a user input for requesting the content sharing, through the object 521 displayed in the display.

If the user input is received, the first electronic device 200 may make a request to the second electronic device 300 for content and may receive the content from the second electronic device 300. Referring to an image 530 of FIG. 5, the first electronic device 200 may display content 531, which is received from the second electronic device 300, in the display.

According to an embodiment, if a type of the content is a text or the size of the content is less than a specified size, the first electronic device 200 may make a request to the second electronic device 300 for the content through the input device 100 and may receive the content from the second electronic device 300 through the input device 100. According to another embodiment, if a type of the content is an image or a video or the size of the content is not less than the specified size, the first electronic device 200 may directly request the content from the second electronic device 300 without passing through the input device 100 and may directly receive the content from the second electronic device 300.

Figure 6:
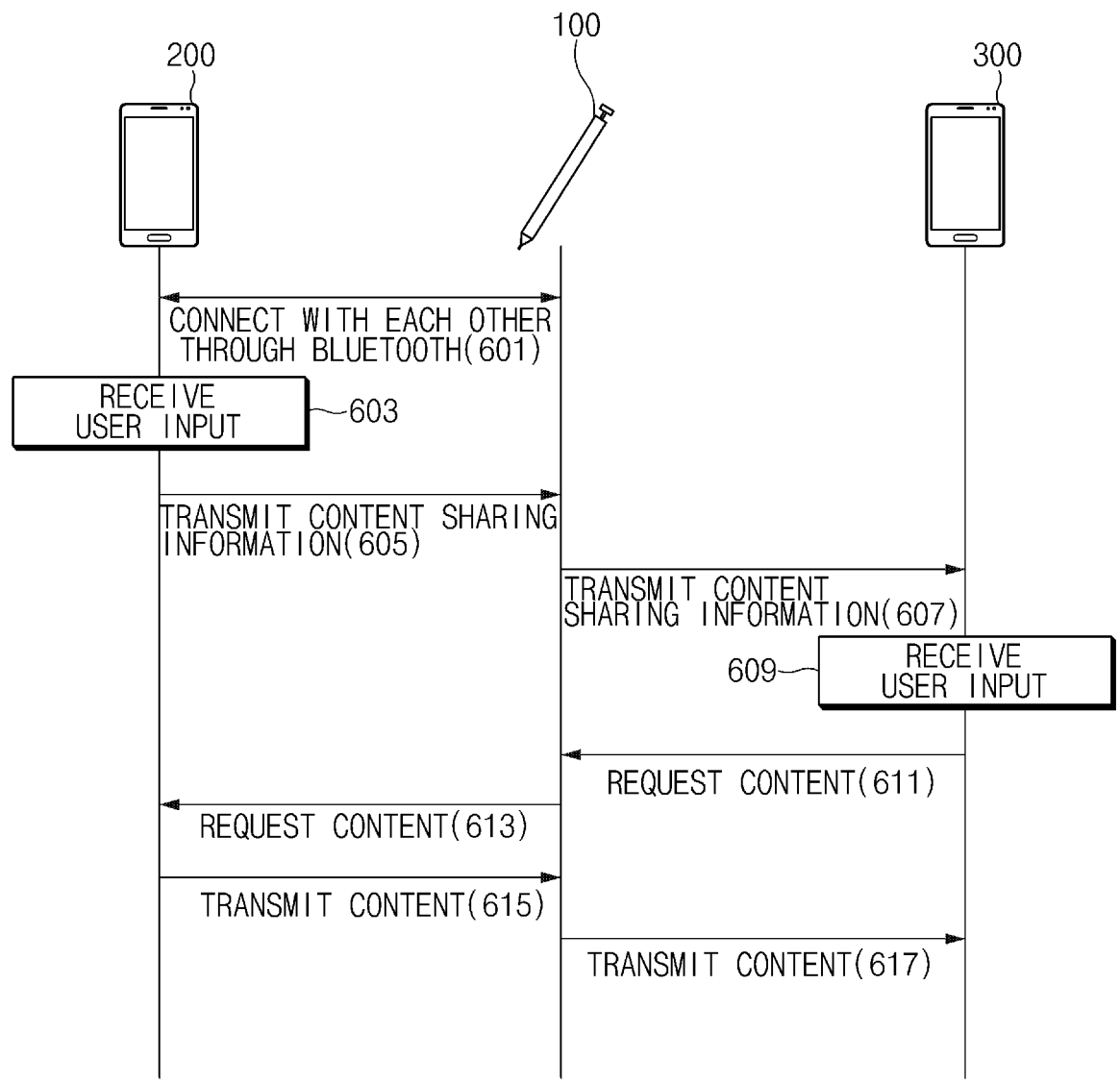
FIG. 6 is a flowchart illustrating an example content sharing method of a content sharing system, according to various example embodiments of the present disclosure.

FIG. 6 is a flowchart illustrating an example content sharing method of a content sharing system, according to various example embodiments of the present disclosure.

FIG. 6 refers, for example, to an embodiment in which content is transmitted from the first electronic device 200 to the second electronic device 300 through the input device 100.

Referring to FIG. 6, in operation 601, the input device 100 and the first electronic device 200 may be connected with each other through, for example, and without limitation, Bluetooth.

In operation 603, the first electronic device 200 may receive a user input. For example, the first electronic device 200 may receive the user input for setting sharing content. A user may input, for example, a user command for setting the sharing content by using the input device 100 or a finger.

In operation 605, the first electronic device 200 may transmit content sharing information to the input device 100. The content sharing information may include, for example, information indicating that there is the content to be shared. The content sharing information may further include, for example, information about the content to be shared such as a type of the content (e.g., an image, a text, or the like), a size of the content, a device in which the content is stored, a storage address of the content, a content sharing method, or the like. The information about the content sharing method may include, for example, information about whether to share the content through the input device 100 or whether to share the content without passing through the input device 100.

According to an embodiment, the first electronic device 200 may determine a content sharing method based on the type of the content or the size of the content. For example, if the type of the content is a text or the size of the content is less than a specified size, the first electronic device 200 may determine to share the content through the input device 100.

In operation 607, the input device 100 may transmit the content sharing information, which is received from the first electronic device 200, to the second electronic device 300. According to an embodiment, while the input device 100 is in contact with a touch screen of the second electronic device 300 (or while the input device 100 is located within a specified distance between the touch screen and the input device 100 without contacting with the touch screen), the input device 100 may transmit the content sharing information to the second electronic device 300.

In operation 609, the second electronic device 300 may receive the user input. For example, the second electronic device 300 may receive the user input for requesting the sharing of the content. The user may input, for example, the user command for requesting the sharing of the content by using the input device 100.

In operation 611, the second electronic device 300 may make a request to the input device 100 for the content. According to an embodiment, the second electronic device 300 may verify the content sharing method included in the content sharing information. In the case where the second electronic device 300 is configured such that the content is shared through the input device 100, the second electronic device 300 may make a request to the input device 100 for the content. The case where the content is shared without passing through the input device 100 will be described with reference to FIG. 8.

If the content request is received from the second electronic device 300, in operation 613, the input device 100 may make a request to the first electronic device 200 for the content.

In operation 615, the first electronic device 200 may transmit the content to the input device 100. If the content is received from the first electronic device 200, in operation 617, the input device 100 may transmit the content to the second electronic device 300. According to an embodiment, the input device 100 may transmit the content, which is received from the first electronic device 200, to the second electronic device 300 in an on the fly scheme without storing the content received from the first electronic device 200. According to an embodiment, while the input device 100 is in contact with a touch screen of the second electronic device 300 (or while the input device 100 is located within a specified distance between the touch screen and the input device 100 without contacting with the touch screen), the input device 100 may transmit the content to the second electronic device 300.

Figure 7:
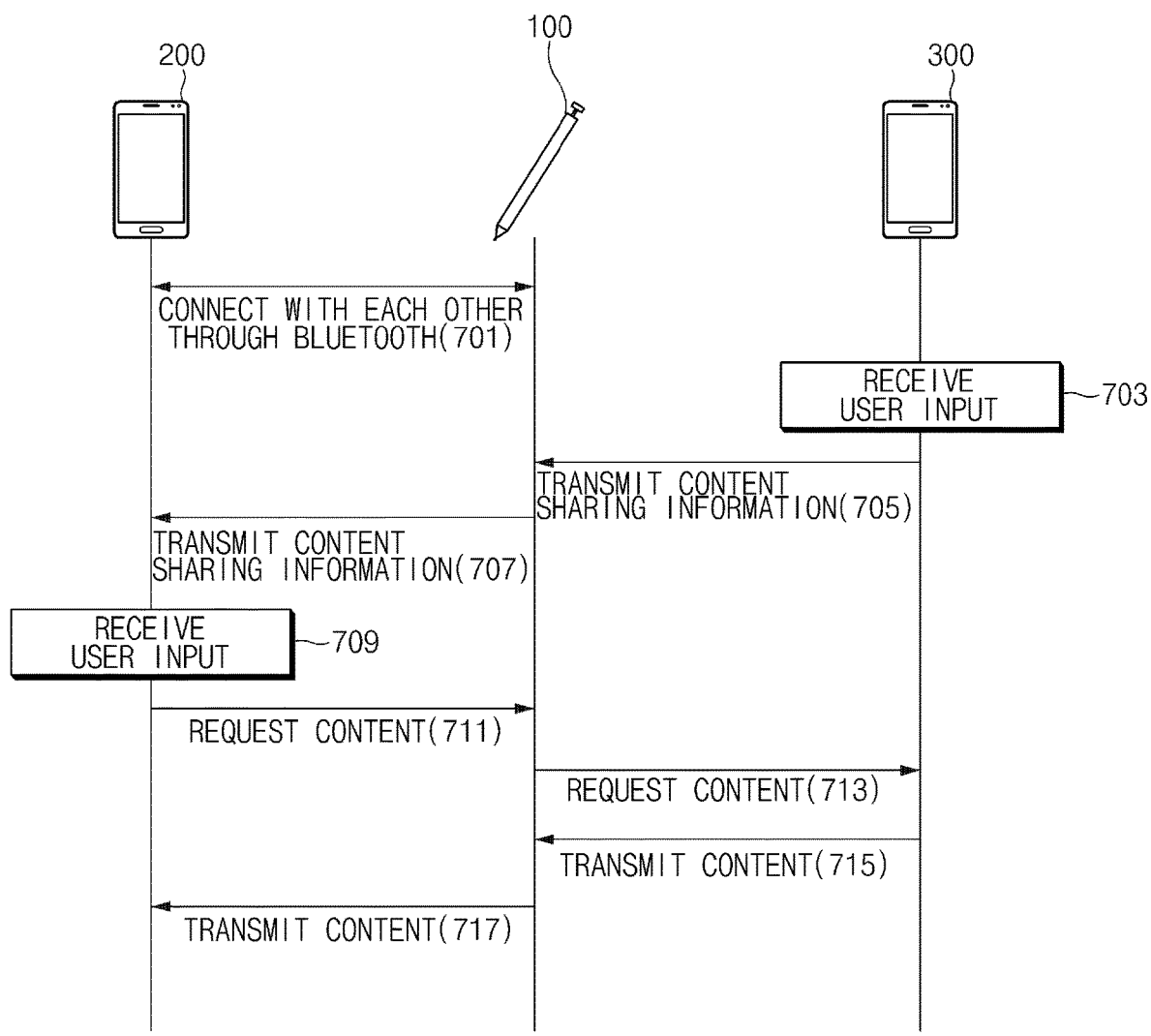
FIG. 7 is a flowchart illustrating an example content sharing method of a content sharing system, according to various example embodiments of the present disclosure.

FIG. 7 is a flowchart illustrating an example content sharing method of a content sharing system, according to various example embodiments of the present disclosure.

FIG. 7 refers, for example, to an embodiment in which content is transmitted from the second electronic device 300 to the first electronic device 200 through the input device 100.

Referring to FIG. 7, in operation 701, the input device 100 and the first electronic device 200 may be connected with each other through, for example, and without limitation, Bluetooth.

In operation 703, the second electronic device 300 may receive the user input. For example, the second electronic device 300 may receive a user input for setting sharing content. A user may input, for example, a user command for setting the sharing content by using the input device 100.

In operation 705, the second electronic device 300 may transmit content sharing information to the input device 100. The content sharing information may include, for example, information indicating that there is the content to be shared. The content sharing information may further include, for example, information about the content to be shared such as a type of the content (e.g., an image, a text, or the like), a size of the content, a device in which the content is stored, a storage address of the content, a content sharing method, or the like. The information about the content sharing method may include, for example, information about whether to share the content through the input device 100 or whether to share the content without passing through the input device 100.

According to an embodiment, the second electronic device 300 may determine a content sharing method based on the type of the content or the size of the content. For example, if the type of the content is a text or the size of the content is less than a specified size, the second electronic device 300 may determine to share the content through the input device 100.

According to an embodiment, while the input device 100 is in contact with a touch screen (or while the input device 100 is located within a specified distance between the touch screen and the input device 100 without contacting with the touch screen), the second electronic device 300 may transmit the content sharing information to the input device 100.

In operation 707, the input device 100 may transmit the content sharing information, which is received from the second electronic device 300, to the first electronic device 200.

In operation 709, the first electronic device 200 may receive a user input. For example, the first electronic device 200 may receive the user input for requesting the sharing of the content. The user may input, for example, a user command for requesting the sharing of the content by using the input device 100 or a finger.

In operation 711, the first electronic device 200 may make a request to the input device 100 for the content. According to an embodiment, the first electronic device 200 may verify the content sharing method included in the content sharing information. In the case where the first electronic device 200 is configured such that the content is shared through the input device 100, the first electronic device 200 may make a request to the input device 100 for the content. The case where the content is shared whether to share the content the input device 100 will be described with reference to FIG. 9.

If the content request is received from the first electronic device 200, in operation 713, the input device 100 may make a request to the second electronic device 300 for the content.

In operation 715, the second electronic device 300 may transmit the content to the input device 100. According to an embodiment, while the input device 100 is in contact with a touch screen (or while the input device 100 is located within a specified distance between the touch screen and the input device 100 without contacting with the touch screen), the second electronic device 300 may transmit the content to the input device 100.

If the content is received from the second electronic device 300, in operation 717, the input device 100 may transmit the content to the first electronic device 200. According to an embodiment, the input device 100 may transmit the content, which is received from the second electronic device 300, to the first electronic device 200 in an on the fly scheme without storing the content received from the second electronic device 300.

Figure 8:
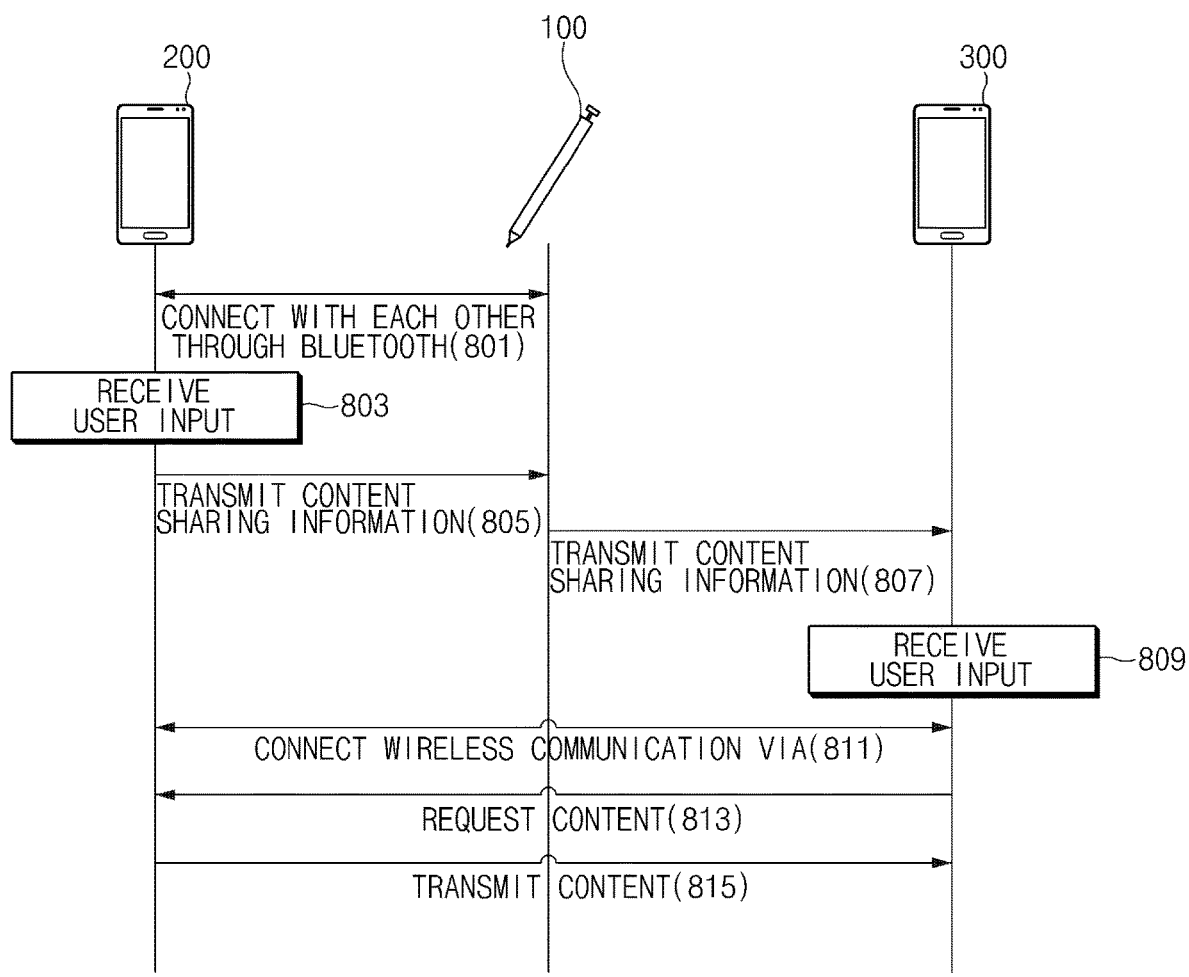
FIG. 8 is a flowchart illustrating an example content sharing method of a content sharing system, according to various example embodiments of the present disclosure.

FIG. 8 is a flowchart illustrating an example content sharing method of a content sharing system, according to various example embodiments of the present disclosure.

FIG. 8 refers, for example, to an embodiment in which content is directly transmitted from the first electronic device 200 to the second electronic device 300 without passing through the input device 100 if the size of the content is not less than (e.g., greater than) a specified size.

Referring to FIG. 8, in operation 801, the input device 100 and the first electronic device 200 may be connected with each other through, for example, and without limitation, Bluetooth.

In operation 803, the first electronic device 200 may receive a user input. For example, the first electronic device 200 may receive the user input for setting sharing content. A user may input, for example, a user command for setting the sharing content by using the input device 100 or a finger.

In operation 805, the first electronic device 200 may transmit content sharing information to the input device 100. The content sharing information may include, for example, information indicating that there is the content to be shared. The content sharing information may further include, for example, information about the content to be shared such as a type of the content (e.g., an image, a text, or the like), a size of the content, a device in which the content is stored, a storage address of the content, a content sharing method, or the like. The information about the content sharing method may include, for example, information about whether to share the content through the input device 100 or whether to share the content without passing through the input device 100.

According to an embodiment, the first electronic device 200 may determine a content sharing method based on the type of the content or the size of the content. For example, if the type of the content is an image or a video or the size of the content is not less (e.g., greater than) than a specified size, the first electronic device 200 may determine to share the content without passing through the input device 100.

In operation 807, the input device 100 may transmit the content sharing information, which is received from the first electronic device 200, to the second electronic device 300. According to an embodiment, while the input device 100 is in contact with a touch screen of the second electronic device 300 (or while the input device 100 is located within a specified distance between the touch screen and the input device 100 without contacting with the touch screen), the input device 100 may transmit the content sharing information to the second electronic device 300.

In operation 809, the second electronic device 300 may receive the user input. For example, the second electronic device 300 may receive the user input for requesting the sharing of the content. The user may input, for example, the user command for requesting the sharing of the content by using the input device 100.

In operation 811, the first electronic device 200 and the second electronic device 300 may be connected with each other through a wireless communication. According to an embodiment, the first electronic device 200 and the second electronic device 300 may be connected through, for example, and without limitation, Bluetooth, NFC or Wi-Fi.

According to an embodiment, the second electronic device 300 may verify the content sharing method included in the content sharing information. In the case where the second electronic device 300 is configured such that the content is shared without passing through the input device 100, the second electronic device 300 may make a request to the first electronic device 200 for wireless communication connection. The second electronic device 300 may request the wireless communication connection based on the method included in the content sharing information. Alternatively, the second electronic device 300 may select an optimal wireless communication method (e.g., Wi-Fi) based on a specified standard and may request the wireless communication connection based on the selected method. According to an embodiment, in the case where the first electronic device 200 and the second electronic device 300 are connected with each other in advance, operation 811 may be omitted.

In operation 813, the second electronic device 300 may make a request to the first electronic device 200 for the content. In operation 815, the first electronic device 200 may transmit the content to the second electronic device 300 in response to the content request.

Figure 9:
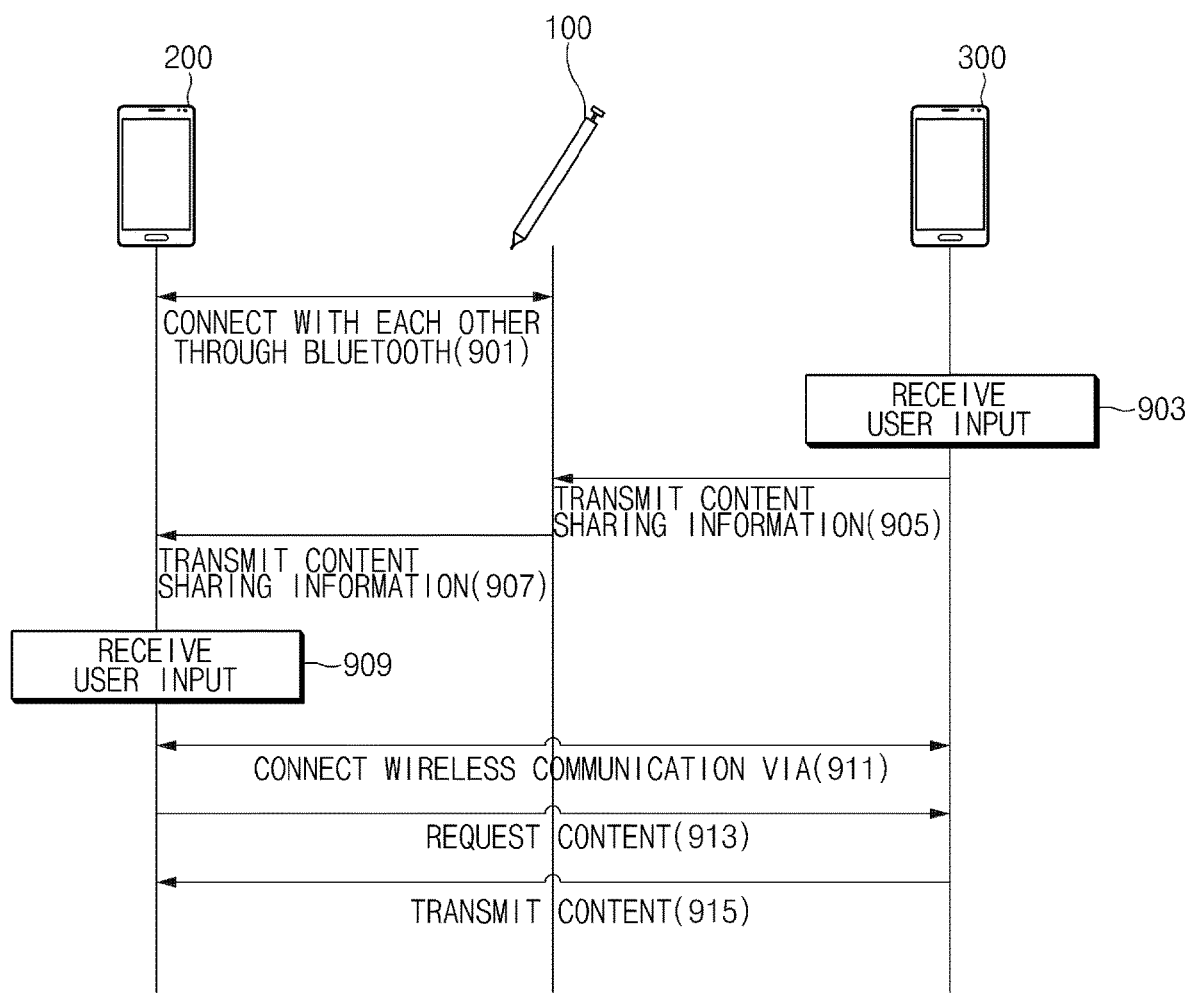
FIG. 9 is a flowchart illustrating an example content sharing method of a content sharing system, according to various example embodiments of the present disclosure.

FIG. 9 is a flowchart illustrating an example content sharing method of a content sharing system, according to various example embodiments of the present disclosure.

FIG. 9 refers, for example, to an embodiment in which content is directly transmitted from the second electronic device 300 to the first electronic device 200 without passing through the input device 100 if the size of the content is not less than (e.g., greater than) a specified size.

Referring to FIG. 9, in operation 801, the input device 100 and the first electronic device 200 may be connected with each other through, for example, and without limitation, Bluetooth.

In operation 903, the second electronic device 300 may receive the user input. For example, the second electronic device 300 may receive the user input for setting sharing content. A user may input, for example, a user command for setting the sharing content by using the input device 100.

In operation 905, the second electronic device 300 may transmit content sharing information to the input device 100. The content sharing information may include, for example, information indicating that there is the content to be shared. The content sharing information may further include, for example, information about the content to be shared such as a type of the content (e.g., an image, a text, or the like), a size of the content, a device in which the content is stored, a storage address of the content, a content sharing method, or the like. The information about the content sharing method may include, for example, information about whether to share the content through the input device 100 or whether to share the content without passing through the input device 100.

According to an embodiment, the second electronic device 300 may determine a content sharing method based on the type of the content or the size of the content. For example, if the type of the content is an image or a video or the size of the content is not less than (e.g., greater than) a specified size, the second electronic device 300 may determine to share the content without passing through the input device 100.

According to an embodiment, while the input device 100 is in contact with a touch screen (or while the input device 100 is located within a specified distance between the touch screen and the input device 100 without contacting with the touch screen), the second electronic device 300 may transmit the content sharing information to the input device 100.

In operation 907, the input device 100 may transmit the content sharing information, which is received from the second electronic device 300, to the first electronic device 200.

In operation 909, the first electronic device 200 may receive a user input. For example, the first electronic device 200 may receive the user input for requesting the sharing of the content. The user may input, for example, a user command for requesting the sharing of the content by using the input device 100 or a finger.

In operation 911, the first electronic device 200 and the second electronic device 300 may be connected with each other through a wireless communication. According to an embodiment, the first electronic device 200 and the second electronic device 300 may be connected through, for example, and without limitation, Bluetooth, NFC or Wi-Fi.

According to an embodiment, the first electronic device 200 may verify the content sharing method included in the content sharing information. In the case where the first electronic device 200 is configured such that the content is shared without passing through the input device 100, the first electronic device 200 may request wireless communication connection from the second electronic device 300. The first electronic device 200 may request the wireless communication connection based on the method included in the content sharing information. Alternatively, the first electronic device 200 may select an optimal wireless communication method (e.g., Wi-Fi) based on a specified standard and may request the wireless communication connection based on the selected method. According to an embodiment, in the case where the first electronic device 200 and the second electronic device 300 are connected with each other in advance, operation 911 may be omitted.

In operation 913, the first electronic device 200 may make a request to the second electronic device 300 for the content. In operation 915, the second electronic device 300 may transmit the content to the first electronic device 200 in response to the content request.

The term "module" used in this disclosure may refer, for example, to a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, and without limitation, the "module" may include at least one of a dedicated processor, a CPU, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., a control module 170), may cause the one or more processors to perform a function corresponding to the instruction.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various embodiments of the present disclosure, content may be conveniently shared with another electronic device through an input device. The content may be shared through the input device even though the input device is not registered in an electronic device.

While the present disclosure has been illustrated and described with reference to various example embodiments thereof, it will be understood by those skilled in the art that various changes in form and details may be made therein without departing from the spirit and scope of the present disclosure as defined by the appended claims and their equivalents.

What is claimed is:
1. An input device for an electronic device comprising:
a first communication module comprising communication circuitry configured to communicate with a first electronic device;
a second communication module comprising communication circuitry configured to communicate with a second electronic device;
a battery; and
a processor configured to:
receive content from the first electronic device through the first communication module;
transmit the content received from the first electronic device to the second communication module in an on the fly scheme without storing the content received from the first electronic device in a memory; and transmit the content received from the first electronic device to the second electronic device through the second communication module using power supplied from the battery.

2. The input device of claim 1, wherein the processor is configured to:

receive content sharing information from the first electronic device;

transmit the content sharing information received from the first electronic device to the second electronic device;

receive a content request from the second electronic device based on an input which is input to the second electronic device by the input device;

request content from the first electronic device; and receive the content from the first electronic device in response to the request.

3. The input device of claim 1, wherein the first communication module comprises a short-range wireless communication module comprising short-range communication circuitry configured to perform communication with the first electronic device, and wherein the second communication module comprises an electromagnetic communication module comprising electromagnetic communication circuitry configured to perform electromagnetic communication with the second electronic device.

4. The input device of claim 3, wherein the electromagnetic communication module is configured to perform the electromagnetic communication with the second electronic device in a state where the input device is in contact with a touch screen of the second electronic device.

5. The input device of claim 3, wherein the electromagnetic communication module includes:

an electromagnetic coil; and a transceiver circuit configured to transmit and/or receive an electromagnetic signal through the electromagnetic coil.

6. The input device of claim 5, wherein the processor is configured to:

generate an electromagnetic signal corresponding to the content received from the first electronic device using the transceiver circuit;

modulate a frequency and/or a phase of the electromagnetic signal; and transmit the modulated electromagnetic signal to the second electronic device through the electromagnetic coil.

7. The input device of claim 1, wherein the content comprises text content having a size less than a specified size.

8. The input device of claim 1, wherein the processor is configured to:

receive content sharing information from the second electronic device based on an input that is input to the second electronic device by the input device;

transmit the content sharing information to the first electronic device;

receive a content request from the first electronic device;

request content from the second electronic device;

receive the content from the second electronic device through the second communication module;

transmit the content to the first communication module without storing the content in the memory; and transmit the content to the first electronic device through the first communication module.

9. A content sharing method of an input device for an electronic device, the method comprising:

receiving, by the input device which includes circuitry, content from a first electronic device through a first communication module comprising communication circuitry;

transmitting the content to a second communication module comprising communication circuitry in an on the fly scheme without storing the content in a memory; and transmitting the content to a second electronic device through the second communication module using power supplied from a battery included in the input device.

10. The method of claim 9, further comprising:

receiving content sharing information from the first electronic device;

transmitting the content sharing information to the second electronic device;

receiving a content request from the second electronic device based on an input that is input to the second electronic device by the input device; and requesting content from the first electronic device.

11. The method of claim 9, wherein the first communication module comprises a short-range wireless communication module comprising short-range communication circuitry configured to perform communication with the first electronic device, and wherein the second communication module comprises an electromagnetic communication module comprising electromagnetic communication circuitry configured to perform electromagnetic communication with the second electronic device.

12. The method of claim 11, wherein the electromagnetic communication module is configured to perform electromagnetic communication with the second electronic device in a state where the input device is in contact with a touch screen of the second electronic device.

13. The method of claim 11, wherein the transmitting of the content to the second electronic device includes:

generating an electromagnetic signal corresponding to the content, which is received from the first electronic device, using the electromagnetic communication module;

modulating a frequency and/or a phase of the electromagnetic signal; and transmitting the modulated electromagnetic signal to the second electronic device.

14. The method of claim 9, wherein the content comprises text content having a size less than a specified size.

15. The method of claim 9, further comprising:

receiving content sharing information from the second electronic device through the second communication module based on an input that is input to the second electronic device by the input device;

transmitting the content sharing information to the first electronic device through the first communication module;

receiving a content request from the first electronic device through the first communication module;

requesting content from the second electronic device through the second communication module;

receiving the content from the second electronic device through the second communication module;

transmitting the content to the first communication module without storing the content in the memory; and transmitting the content to the first electronic device through the first communication module.

16. A non-transitory computer-readable recording medium having recorded thereon a program, the program, when executed by a processor, causing an input device to perform operations comprising:
    receiving content from a first electronic device through a first communication module;
    transmitting the content received from the first electronic device to a second communication module in an on the fly scheme without storing the content in a memory; and
    transmitting the content to a second electronic device through the second communication module using power supplied from a battery included in an input device.

17. The non-transitory computer-readable recording medium of claim 16, wherein the operations further comprise:
    receiving content sharing information from the first electronic device;
    transmitting the content sharing information to the second electronic device;
    receiving a content request from the second electronic device based on an input that is input to the second electronic device by the input device; and
    requesting content from the first electronic device.

18. The non-transitory computer-readable recording medium of claim 16, wherein the transmitting of the content to a second electronic device includes:
    generating an electromagnetic signal corresponding to the content, which is received from the first electronic device, using an electromagnetic communication module;
    modulating a frequency and/or a phase of the electromagnetic signal; and
    transmitting the modulated electromagnetic signal to the second electronic device.

19. The non-transitory computer-readable recording medium of claim 16, wherein the operations further comprise:
    receiving content sharing information from the second electronic device through the second communication module based on an input that is input to the second electronic device by the input device;
    transmitting the content sharing information to the first electronic device through the first communication module;
    receiving a content request from the first electronic device through the first communication module;
    requesting content from the second electronic device through the second communication module;
    receiving the content from the second electronic device through the second communication module;
    transmitting the content to the first communication module in an on the fly scheme without storing the content in the memory; and
    transmitting the content to the first electronic device through the first communication module.

* * * * *